US010642892B2

(12) United States Patent
Xiao et al.

(10) Patent No.: US 10,642,892 B2
(45) Date of Patent: May 5, 2020

(54) VIDEO SEARCH METHOD AND APPARATUS

(71) Applicant: TENCENT TECHNOLOGY (SHENZHEN) COMPANY LIMITED, Shenzhen (CN)

(72) Inventors: Ying Xiao, Shenzhen (CN); Zhenyu Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 257 days.

(21) Appl. No.: 15/712,316

(22) Filed: Sep. 22, 2017

(65) Prior Publication Data
US 2018/0025079 A1 Jan. 25, 2018

Related U.S. Application Data

(63) Continuation of application No. PCT/CN2016/112390, filed on Dec. 27, 2016.

(30) Foreign Application Priority Data

Dec. 30, 2015 (CN) .......................... 2015 1 1017439

(51) Int. Cl.
G06F 16/732 (2019.01)
G06F 16/738 (2019.01)
(Continued)

(52) U.S. Cl.
CPC ........ *G06F 16/7328* (2019.01); *G06F 16/739* (2019.01); *G06F 16/743* (2019.01);
(Continued)

(58) Field of Classification Search
CPC ........ G06N 5/04; G11B 27/032; G11B 27/34; H04N 21/4826; G06F 16/7328
See application file for complete search history.

(56) References Cited

U.S. PATENT DOCUMENTS 7,739,599 B2* 6/2010 Patten .................. G11B 27/032
715/716
8,631,439 B2* 1/2014 Mitchem ................ G11B 27/34
725/37
(Continued)

FOREIGN PATENT DOCUMENTS

CN 101566998 10/2009
CN 102207966 10/2011
(Continued)

OTHER PUBLICATIONS

International Preliminary Report on Patentability dated Jul. 3, 2018 in PCT/CN2016/112390 filed Dec. 27, 2016. p. 1-5.
(Continued)

Primary Examiner — Etienne P Leroux
(74) Attorney, Agent, or Firm — Oblon, McClelland, Maier & Neustadt, L.L.P.

(57) ABSTRACT

Aspects of the disclosure provide a method for video search. The method includes obtaining a video to be labeled, predicting feature tags respectively for video frames in the video using a classification model, combining at least a first video frame and a second video frame adjacent in time into a video segment when the first video frame and the second video frame have a same predicted feature tag, and labeling the video segment with the same predicted feature tag as a segment feature tag. In an embodiment, the method includes determining a search tag in response to a search request, searching one or more candidate videos that have been labeled with feature tags according to the search tag, and presenting an output video when the output video includes a matching feature tag to the search tag.

23 Claims, 9 Drawing Sheets

(51) Int. Cl.
*G06F 16/74* (2019.01)
*G06F 16/783* (2019.01)
*G06K 9/00* (2006.01)
*G06F 16/71* (2019.01)

(52) U.S. Cl.
CPC .......... *G06F 16/745* (2019.01); *G06F 16/783* (2019.01); *G06K 9/00718* (2013.01); *G06K 9/00765* (2013.01); *G06F 16/71* (2019.01); *G06F 16/7837* (2019.01)

(56) References Cited

U.S. PATENT DOCUMENTS

| | | | |
|---|---|---|---|
| 9,280,742 B1* | 3/2016 | Sargin | G06N 5/04 |
| 2009/0150947 A1 | 6/2009 | Soderstrom | |
| 2015/0074700 A1* | 3/2015 | Danovitz | H04N 21/4826 725/14 |

FOREIGN PATENT DOCUMENTS

| | | |
|---|---|---|
| CN | 102360431 | 2/2012 |
| CN | 102663015 | 9/2012 |
| CN | 103761284 | 4/2014 |
| CN | 104133875 | 11/2014 |
| CN | 105677735 | 6/2016 |

OTHER PUBLICATIONS

Office Action dated Jul. 2, 2019 in Chinese Patent Application No. 201511017439.6 (With Concise English Translation) p. 1-16.
Written Opinion of the International Searching Authority dated Mar. 1, 2017 in PCT/CN2016/112390 filed Dec. 27, 2016. (With English Translation) p. 1-9.
Dongwang Jin et al., <Library Information Service Research>, May 31, 2013, pp. 250-258.
International Search Report dated Mar. 1, 2017 in PCT/CN2016/112390 filed Dec. 27, 2016 (With English Translation).

* cited by examiner

VIDEO SEARCH METHOD AND APPARATUS

RELATED APPLICATION

This application is a continuation of International Application No. PCT/CN2016/112390, filed on Dec. 27, 2016, which claims priority to Chinese Patent Application No. 201511017439.6, entitled "VIDEO SEARCH METHOD AND APPARATUS" filed with the Chinese Patent Office on Dec. 30, 2015. The entire disclosures of the prior applications are hereby incorporated by reference herein in their entirety.

FIELD OF THE TECHNOLOGY

The present disclosure relates to the field of communications technologies, and in particular, to a video search method and apparatus.

BACKGROUND OF THE DISCLOSURE

With the rapid development of Internet technologies, increasing network resources can be searched and queried by users on the Internet. It is particularly important to accurately find a resource required by a user from these resources.

Video resources are used as an example. Usually, a video is manually split and clipped to obtain multiple video segments, and relevant titles are added. A user enters a search word in a unified comprehensive search box for a network-wide search. A search result is presented when the search word completely matches an added title.

In a process of researching and practicing the related example, the inventor of the present disclosure finds that because splitting, clipping, and title adding of a video in the related example all need to be performed manually, and many manual operations are required, a title is prone to be incomplete or inaccurate, directly leading to low video search efficiency and low accuracy of a search result.

SUMMARY

The objective of the present disclosure is to provide a video search method and apparatus, so as to improve search efficiency and accuracy of a search result.

Aspects of the disclosure provide a method for video search. The method includes obtaining a video to be labeled, predicting feature tags respectively for video frames in the video using a classification model, combining at least a first video frame and a second video frame adjacent in time into a video segment when the first video frame and the second video frame have a same predicted feature tag, and labeling the video segment with the same predicted feature tag as a segment feature tag.

In an embodiment, the method includes determining a search tag in response to a search request, searching one or more candidate videos that have been labeled with feature tags according to the search tag, and presenting an output video when the output video includes a matching feature tag to the search tag.

To predict the feature tags respectively for the video frames in the video using the classification model, in an embodiment, the method includes extracting a first key video frame in the video to be labeled, obtaining first image features of the first key video frame and predicting a feature tag for the first key video frame according to the first image features using the preset classification model.

According to an aspect of the disclosure, the method includes collecting one or more source videos that have been pre-labeled with scenario tags, extracting second key video frames in the one or more source videos, determining second feature tags respectively for the second key video frames according to the scenario tags, obtaining second image features respectively for the second key video frames, and training the classification model based on the second image features and the second feature tags.

To determine the search tag in response to the search request, in an embodiment, the method includes performing a semantic recognition on the search request based on a neural network model, and determining the search tag in response to the search request according to a semantic recognition result and available feature tags for classification. Further, the method includes collecting search content with corresponding search tags and training the neural network model based on the search content and the corresponding search tags.

To determine the search tag in response to the search request, in an embodiment, the method includes receiving the search request in a search box for a video in play to search the video in play. In the embodiment, to present the output video when the output video includes the matching feature tag to the search tag, the method includes determining, on a progress bar, a specific position corresponding to a specific video segment with the matching feature tag, and prompting the specific position for a selection of the specific video segment to play.

In another embodiment, the method includes receiving the search request in a search box for a plurality of videos to search the plurality of videos. To present the output video when the output video includes the matching feature tag to the search tag, the method includes presenting a list of output videos respectively in a form of video information and attribute information.

Aspects of the disclosure provide an information processing apparatus that includes interface circuitry and processing circuitry. The interface circuitry is configured to receive a video to be labeled. The processing circuitry is configured to predict feature tags respectively for video frames in the video using a classification model, combine at least a first video frame and a second video frame adjacent in time into a video segment when the first video frame and the second video frame have a same predicted feature tag, and label the video segment with the same predicted feature tag as a segment feature tag.

Further, the processing circuitry is configured to determine a search tag in response to a search request, search one or more candidate videos that have been labeled with feature tags according to the search tag and provide an output video when the output video includes a matching feature tag to the search tag.

Compared with the related example, in the embodiments of the present disclosure, first, a video frame tag of a video frame in a to-be-marked video is predicted by using a preset classification model, video frames that are adjacent in time and that have a same video frame tag are merged, and the to-be-marked video is marked with a corresponding video frame tag. Then, when a search request that instructs to search for a video is received from a user, a video frame tag that corresponds to the search request is determined based on a video frame tag marking result, and a target video that is marked with the video frame tag is found in a candidate video and is presented. In the embodiments, video frame tags are predicted, merged and marked to determine, according to a video frame tag marking result, a video frame tag that corresponds to a search request. That is, video content is searched for by using a video frame tag with which a video frame is marked in advance. Compared with a manner of manually adding a title, video search efficiency and accuracy of a search result are greatly improved.

BRIEF DESCRIPTION OF THE DRAWINGS

The following describes the specific implementations of the present disclosure in detail with reference to the accompanying drawings, to make the technical solutions and the beneficial effects of the present disclosure apparent.

DESCRIPTION OF EMBODIMENTS

Figure 1A:
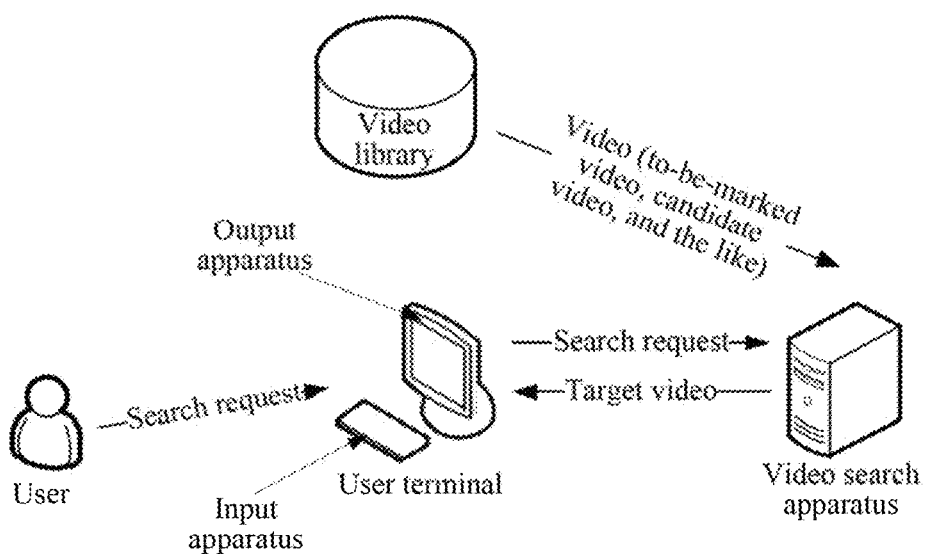
FIG. 1a is a schematic diagram of a scenario of a video search apparatus according to an embodiment of the present disclosure.

Referring to the drawings, same component symbols represent same components. The principle of the present disclosure is described by using examples in which the present disclosure is implemented in proper computing environments. The following descriptions are specific embodiments of the present disclosure based on the examples, and should not be construed as a limit to other specific embodiments of the present disclosure that are not described herein in detail.

In the following descriptions, the specific embodiments of the present disclosure will be described with reference to steps and symbols of operations that are performed by one or more computers, unless indicated otherwise. Therefore, such steps and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by a person skilled in the art. The data structures in which data is maintained are physical locations of the memory that have particular properties defined by the format of the data. However, although the principle of the present disclosure is described in the foregoing context, it is not meant to be limiting as a person skilled in the art will appreciate that the various steps and operations described below may also be implemented in hardware.

The principle of the present disclosure is performed by using many other general-purpose or specific-purpose operations, communications environment, or configurations. An example which is suitable for being applied to a computing system, an environment, and a configuration of the present disclosure may include (but is not limited to) a handheld phone, a personal computer, a server, a multiprocessor system, a microcomputer based system, a host architecture type computer, and a distributed computing environment, which include any one of the foregoing systems or apparatuses.

Embodiments of the present disclosure provide a video search method and apparatus.

Referring to FIG. 1a, FIG. 1a is a schematic diagram of a scenario of a system including a video search apparatus according to an embodiment of the present disclosure. The video search system may include the video search apparatus, which is mainly configured to: predict a video frame tag of a video frame in a to-be-marked video by using a preset classification model, and merge video frames that are adjacent in time and that have a same video frame tag, to mark the to-be-marked video with a corresponding video frame tag. Next, the video search apparatus receives a search request that instructs to search for a video and that is entered by a user, for example, a search request that instructs to search for a "kiss scene in episode A" or a "funny shot in episode B", and determines, based on a video frame tag marking result, a video frame tag that corresponds to the search request. Then, the video search apparatus finds, from a candidate video such as a specified video or videos on an entire network, a target video that is marked with the video frame tag, and finally presents the target video.

In addition, the video search system may further include a video library, which is mainly configured to store a to-be-marked video, so that video search apparatus may mark the to-be-marked video with a corresponding video frame tag. The video library further stores search content that is involved in an actual scenario and an intention tag that corresponds to the search content, so that the video search apparatus performs training based on the search content and the intention tag, to generate a neural network model. In addition, the video library further stores a large quantity of candidate videos, for the video search apparatus to find a target video from the candidate videos, and so on. Certainly, the video search system may further include a user terminal, which is configured to: receive a search request that is directly entered by as user by using an input apparatus such as a keyboard or a mouse, and play a target video by using an output apparatus such as a terminal screen after the target video is determined.

The following provides detailed descriptions separately.

Embodiment 1

In this embodiment, descriptions are provided from the perspective of a video search apparatus. The video search apparatus may be specifically integrated into a network device such as a server or a gateway.

A video search method is provided, including: obtaining a to-be-marked video, and predicting a video frame tag of a video frame in the to-be-marked video by using a preset classification model; merging video frames that are adjacent in time and that have a same video frame tag, and marking the to-be-marked video with a corresponding video frame tag; determining, based on a video frame tag marking result when a search request that instructs to search for a video is received, a video frame tag that corresponds to the search request; and searching a candidate video for a target video that is marked with the video frame tag, and presenting the target video.

Figure 1B:
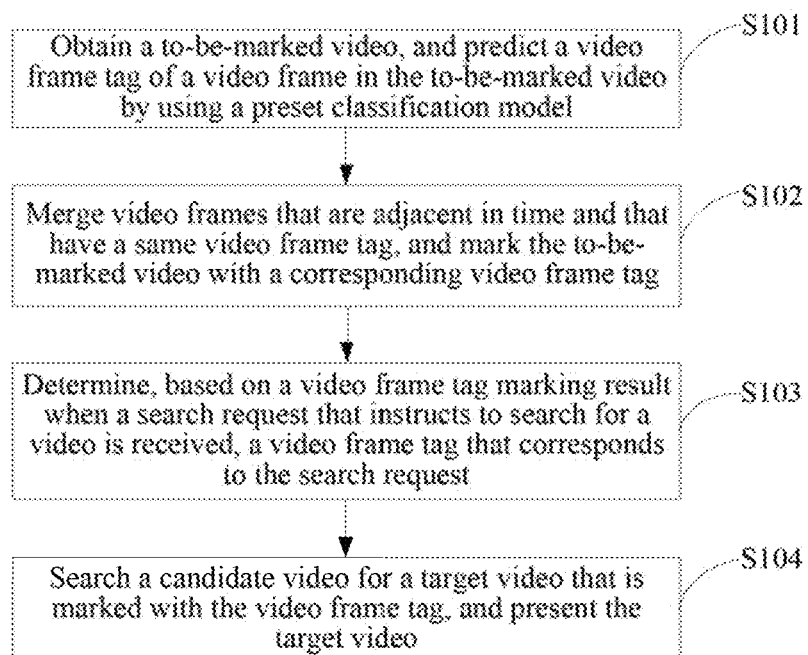
FIG. 1b is a schematic flowchart of a video search method according to Embodiment 1 of the present disclosure.

Referring to FIG. 1b, FIG. 1b is a schematic flowchart of a video search method according to Embodiment 1 of the present disclosure. A specific procedure of the video search method may include the following steps:

Step S101: Obtain a to-be-marked video, and predict a video frame tag of a video frame in the to-be-marked video by using a preset classification model.

Step S102: Merge video frames that are adjacent in time and that have a same video frame tag, and mark the to-be-marked video with a corresponding video frame tag.

Step S103: Determine, based on a video frame tag marking result when a search request that instructs to search for a video is received, a video frame tag that corresponds to the search request.

Step S101 to step S103 may be specifically as follows:

It may be understood that, in one aspect, videos on an entire network need to be marked with video frame tags before the search request is processed. That is, a video frame tag of a video frame in a to-be-marked video is predicted by using a preset classification model, video frames that are adjacent in time and that have a same video frame tag are merged, and the to-be-marked video is marked with a corresponding video frame tag, so as to obtain a video frame tag marking result.

That is, a video search provided in this embodiment is essentially a content-based video search. First, video frame tags of video frames in a to-be-marked video are predicted by using a preset classification model. After prediction, these video frames are collated, and video frames that are adjacent in time and that have a same video frame tag are merged, so as to obtain video segments. Finally, these video segments are respectively marked with corresponding video frame tags, to obtain a video segment marking result, and complete marking of the to-be-marked video by using the video frame tags.

Further, the predicting a video frame tag of a video frame in a to-be-marked video by using a preset classification model may be specifically as follows:

(11) Extract a video frame in the to-be-marked video by using a key frame extraction algorithm, and determine the extracted video frame as a first video frame.

(12) Obtain an image feature of each first video frame, and determine the obtained image feature as a first image feature.

(13) Predict a video frame tag of the first video frame according to the determined first image feature by using the preset classification model.

It may be understood that, for ease of distinguishing and understanding, in this embodiment, the video frame in the to-be-marked video is referred to as the first video frame, and the image feature of the first video frame is referred to as the first image feature. This is not intended to limit implementation of the solution.

Based on this, the merging video frames that are adjacent in time and that have a same video frame tag may be specifically: merging first video frames that are adjacent in time and that have a same video frame tag.

In the key frame extraction algorithm, a video sequence is partitioned into shots, and then a key frame that can represent shot content is extracted from a shot, and the shot is indexed and searched for by using a low-level feature (such as a color, a texture, or a shape) that is extracted from the key frame. The key frame may be extracted based on a shot boundary, extracted based on content analysis, extracted based on clustering, or the like. This is not specifically limited herein.

For another example, after a video frame (that is, the first video frame) in the to-be-marked video is extracted, an image feature (that is, the first image feature) of each first video frame may be obtained by using a deep learning model (GoogleNet), and then a video frame tag of each first video frame is predicted by using a preset classification model such as a support vector machine (SVM) classification model.

Further, a classification model may be further determined before videos on an entire network are marked with video frame tags. For example, steps may be specifically as follows:

a. Collect an original video that has been marked with a scenario tag.

b. Extract a video frame in the original video by using a key frame extraction algorithm, and determine the extracted video frame as a second video frame.

c. Mark the second video frame with a video frame tag according to the scenario tag.

d. Obtain an image feature of each second video frame, and determine the obtained image feature as a second image feature.

e. Perform training based on the video frame tag with which the second video frame is marked and the second image feature, to generate a classification model.

It is readily conceived that, for ease of distinguishing and understanding, in this embodiment, the video frame in the original video that has been marked with a scenario tag is referred to as the second video frame, and the image feature of the second video frame is referred to as the second image feature. This is not intended to limit implementation of the solution.

Based on this, the predicting a video frame tag of the first video frame according to the first image feature by using the preset classification model may be specifically: predicting a video frame tag of the first video frame according to the first image feature by using the classification model.

Specifically, for example, a video segment (which may be referred to as the original video) that has been manually marked with a scenario tag and the scenario tag that corresponds to the video segment are used as training data. A video frame in the original video is extracted by using a key frame extraction algorithm the same as that described above, and an image feature of the video frame in the original video is obtained in the same manner. The SVM classification model is trained by using the SVM training algorithm, thereby completing the training process.

It may be understood that, the determining, based on a video frame tag marking result when a search request that instructs to search for a video is received, a video frame tag that corresponds to the search request (step S103) may be performed in multiple manners, for example:

(21) When a search request that instructs to search for a video is received, perform semantic recognition on the search request based on a preset neural network model.

(22) Determine a video frame tag that corresponds to the search request with reference to a semantic recognition result and the video frame tag marking result.

That is, in another aspect, a network model for performing semantic recognition needs to be determined before the search request is processed. For example, steps may be specifically as follows:

collecting search content and an intention tag that corresponds to the search content; and performing training based on the search content and the intention tag, to generate a neural network model.

The search content and the corresponding intention tag may be obtained from an actual search request of a user. For example, the search content and the corresponding intention tag are used as training data to train a deep neural network (DNN), so as to generate a neural network model.

Based on this, the performing semantic recognition on the search request based on a preset neural network model, and determining a corresponding video frame tag may be specifically: performing semantic recognition on the search request based on the neural network model, and determining a corresponding video frame tag.

Step S104: Search a candidate video for a target video that is marked with the video frame tag, and present the target video.

In a possible implementation, when the candidate video is a currently played video, the receiving a search request that instructs to search for a video may be specifically: receiving a search request that instructs to search for a video in a search box that corresponds to the currently played video.

Based on this, the presenting the target video may be specifically: determining a play location of the target video on a play progress bar of the currently played video, and marking and prompting the play location, for a user to select a segment to play.

That is, in this implementation, a search box is set on a play page of a current video. A target video in the video may be obtained by doing a video search in the search box, and the target video herein is a segment of the current video.

In another possible implementation, when the candidate video is a set of videos on an entire network, the receiving a search request that instructs to search for a video may be specifically: receiving a search request that instructs to search for a video in a network-wide search box.

Based on this, the presenting the target video may be specifically: presenting the target video and attribute information of the target video in a form of a list.

That is, in this implementation, a target video is searched for in videos on an entire network, and the target video is presented in a form of a list after the target video is found. Because many search results are obtained by means of a network-wide search, attribute information that corresponds to the target video is also presented. The attribute information may include one piece or a combination of the following information: a TV drama name and a quantity of episodes, a variety show name and a quantity of episodes, segment duration, players, or the like.

It can be learned from the foregoing descriptions that according to the video search method provided in this embodiment, first, a video frame tag of a video frame in a to-be-marked video is predicted by using a preset classification model, video frames that are adjacent in time and that have a same video frame tag are merged, and the to-be-marked video is marked with a corresponding video frame tag. Then, when a search request that instructs to search for a video is received from a user, a video frame tag that corresponds to the search request is determined based on a video frame tag marking result, and a target video that is marked with the video frame tag is found in a candidate video and is presented. In this embodiment, video frame tags are predicted, merged and marked to determine, according to a video frame tag marking result, a video frame tag that corresponds to a search request. That is, video content is searched for by using a video frame tag with which a video frame is marked in advance. Compared with a manner of manually adding a title, video search efficiency and accuracy of a search result are greatly improved.

Embodiment 2

According to the method described in Embodiment 1, the following further provides detailed descriptions by using examples.

Figure 2A:
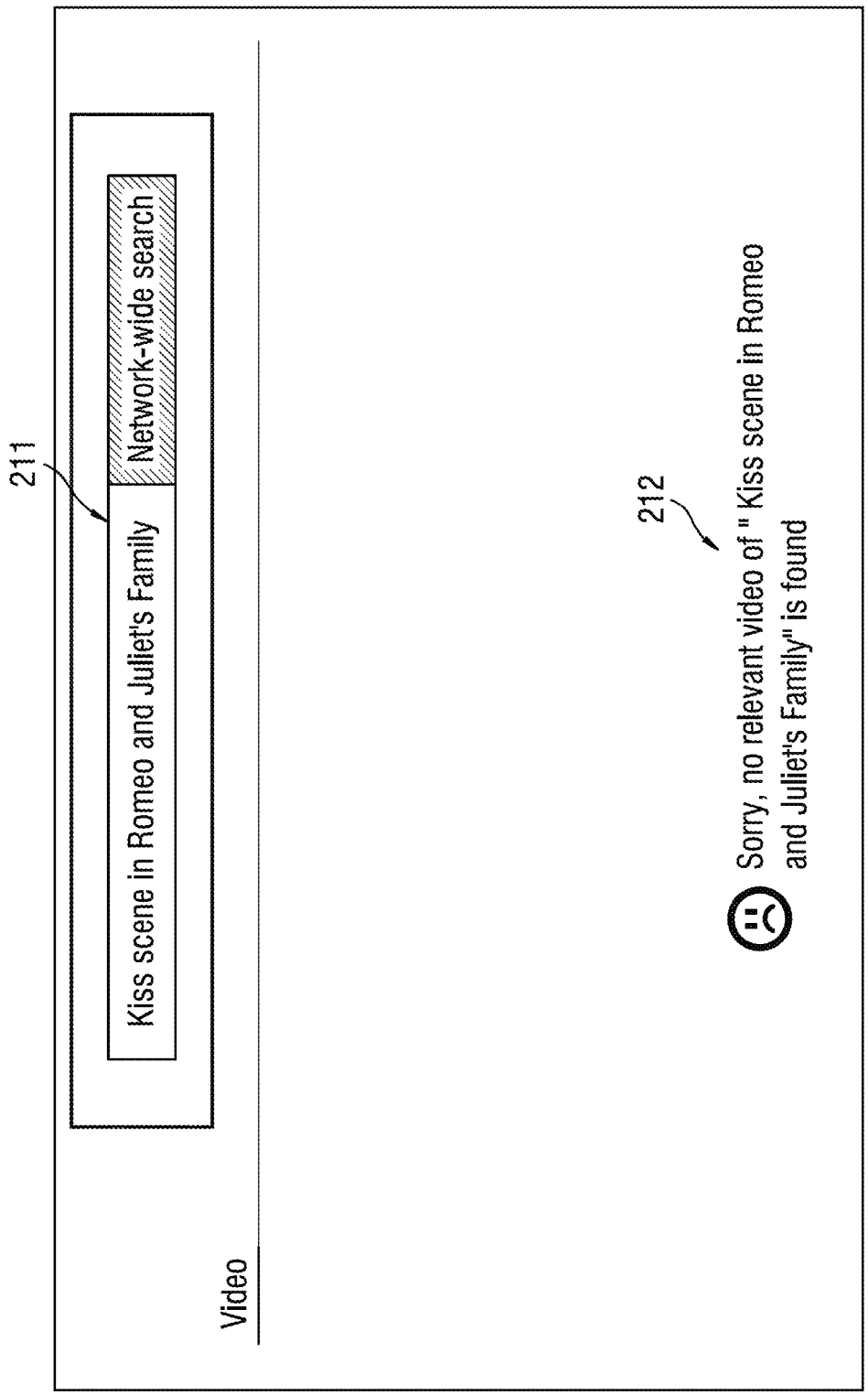
FIG. 2a to FIG. 2h are schematic diagrams of a scenario of a video search method according to Embodiment 2 of the present disclosure.

In a related example, before a video is searched, the video is manually split and clipped to obtain multiple video segments, and relevant titles are added. Referring to FIG. 2a, FIG. 2a is a schematic diagram of a video search in a related example. A user enters a search word in a unified comprehensive search box (marked by a black frame as shown by 211) to do a network-wide search. Search content may include an occupationally-generated content (OGC) video, a professionally-generated content (PGC) video, or a long-tail user-generated content (UGC) video, such as a movie, a television series, or a variety show. When the search word completely matches an added title, a search result is presented. When the search word matches no added title, prompt information indicating that no relevant video is found is presented as shown by 212.

In this embodiment of the present disclosure, first, training and learning are perforated based on an existing original video that has been marked with a scenario tag, to generate a classification model. In addition, a video frame tag of a video frame in the video is predicted by using the classification model and the video frame is marked. Meanwhile, training and learning are performed based on search content that is collected during actual application and a corresponding intention tag, to generate a neural network model. In this way, when a search request that instructs to search for video content is received, semantic recognition is performed on the search request by using the neural network model, to determine a corresponding video frame tag and search for video content that is marked with the video frame tag, thereby presenting the video content to a user and playing the video content.

In this technology, video content may be searched in a specified episode or videos on an entire network, and relevant video segments are marked. Because a high-level semantic recognition technology is used, accuracy of a colloquial search is greatly improved, manpower is reduced to a great extent, and more scenario dimensions are provided for users to do a search. The following provides detailed descriptions.

(1) Search Video Content in a Currently Watched Video

Figure 2B:
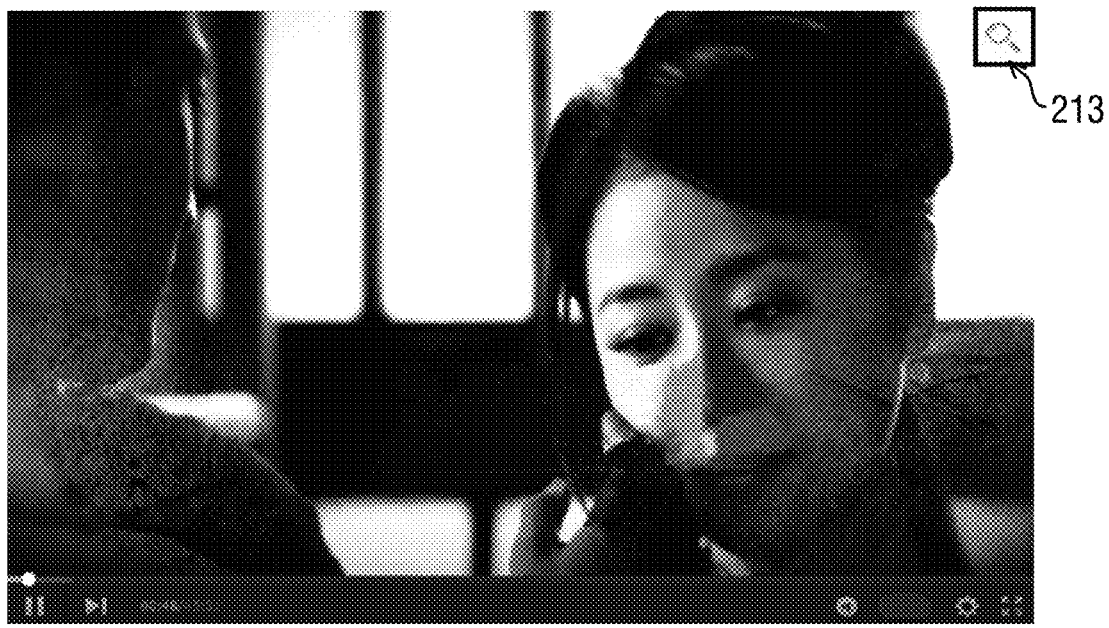
Figure 2C:
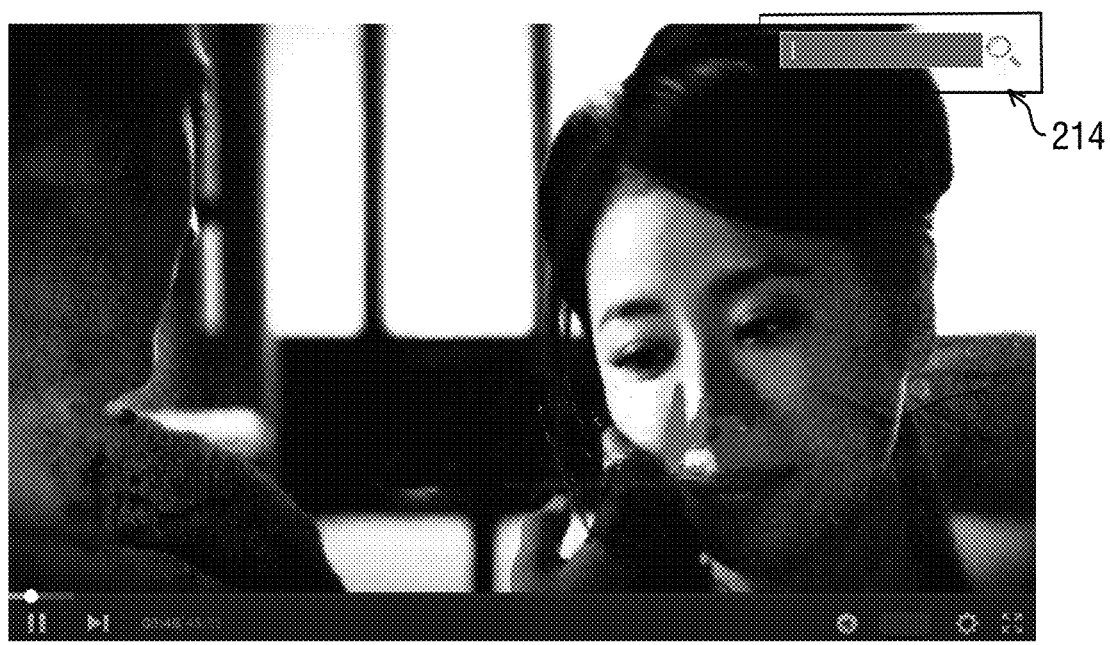

Specifically, in this embodiment of the present disclosure, first, as shown in FIG. 2b, a search icon (marked by a black frame as shown by 213) is set at a corner (such as an upper right corner) of a video play page. As shown in FIG. 2c, when a mouse is moved into the icon, a search box (marked by a black frame as shown by 214) is opened. A user may enter a search word in the search box and press the "enter" key or click the "search icon" to submit a search request. In addition, it is set that if there is no operation within a short time period (such as 3 seconds or 5 seconds), the search box is automatically withdrawn.

Figure 2D:
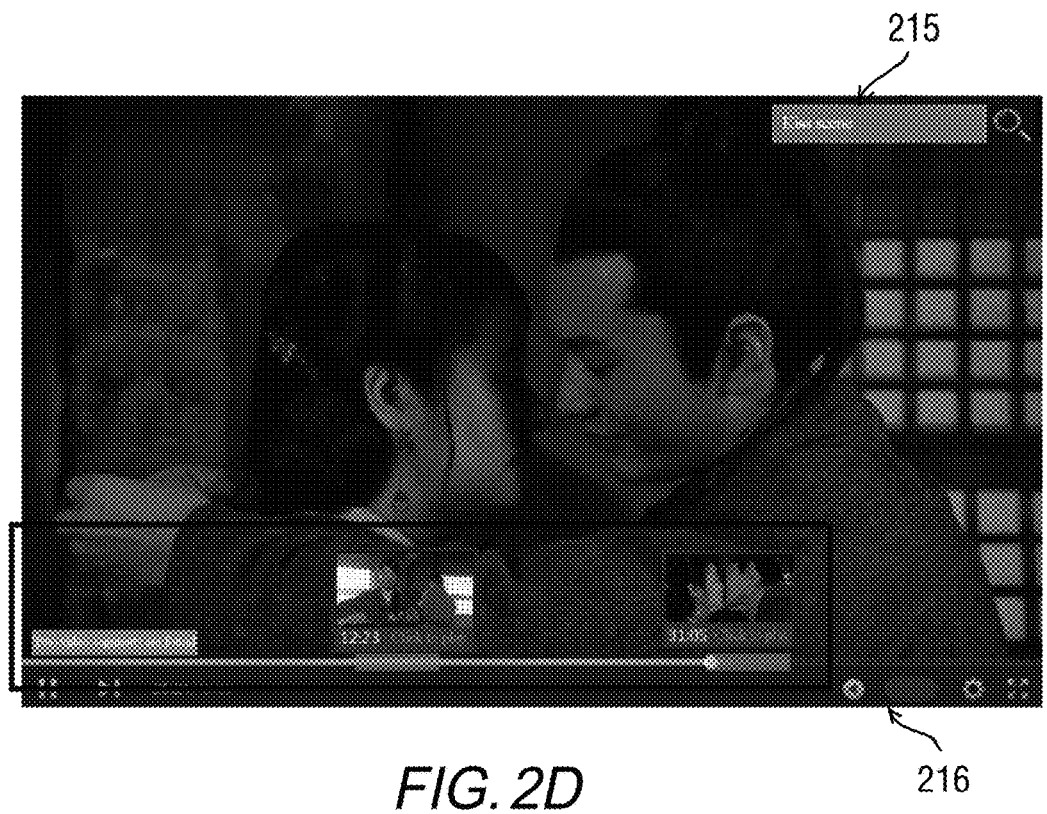

Based on this, after a search word of a video for referred to as a video segment) that a user wants to search for is entered in the search box and confirmed, a play location that corresponds to the video segment that the user wants to search for is marked and prompted on a video play progress bar that is at the lower part of the video play page. As shown in FIG. 2d, the user clicks the corresponding play location according to the prompt, to play the video segment. For example, after search words "kiss scene" are entered in the search box and confirmed as shown by 215, two matching video segments are prompted in a progress bar of a currently played video as shown by 216.

Figure 2E:
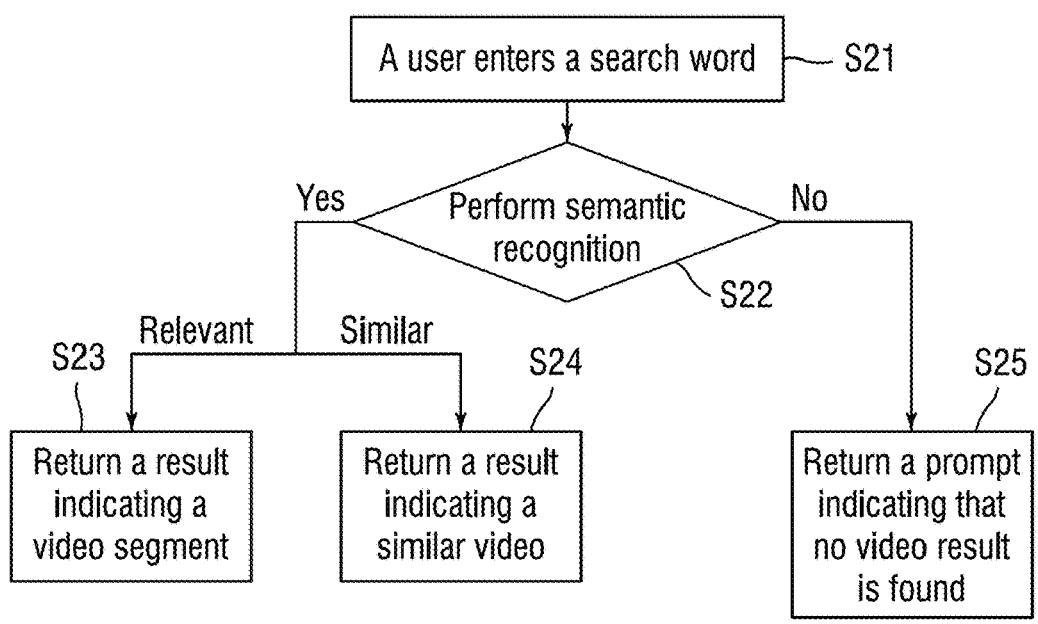

Also referring to FIG. 2e, FIG. 2e is a schematic search flowchart. The search process includes the following steps. S21: A user enters a search word S22: Perform semantic recognition. S23: If there is a relevant video segment, return a result indicating the video segment. S24: If there is a similar video segment, return a result indicating the video segment. S25: If there is no matching video segment, return a prompt indicating that no matching video segment is found. That is, during a video search, video segments that are marked with corresponding video frame tags are found. This may include: If a relevant video segment matching a video segment that a user searches for is found, the corresponding video segment is prompted with a mark at a lower part of a play page. If no relevant video segment matching the video segment that the user searches for is found, but there is a similar segment, a prompt is given. In addition, if neither a video segment matching the video segment that the user searches for nor a similar segment is found, a prompt indicating that no result is found is given.

(2) Search for Video Content in Videos on an Entire Network

Figure 2F:
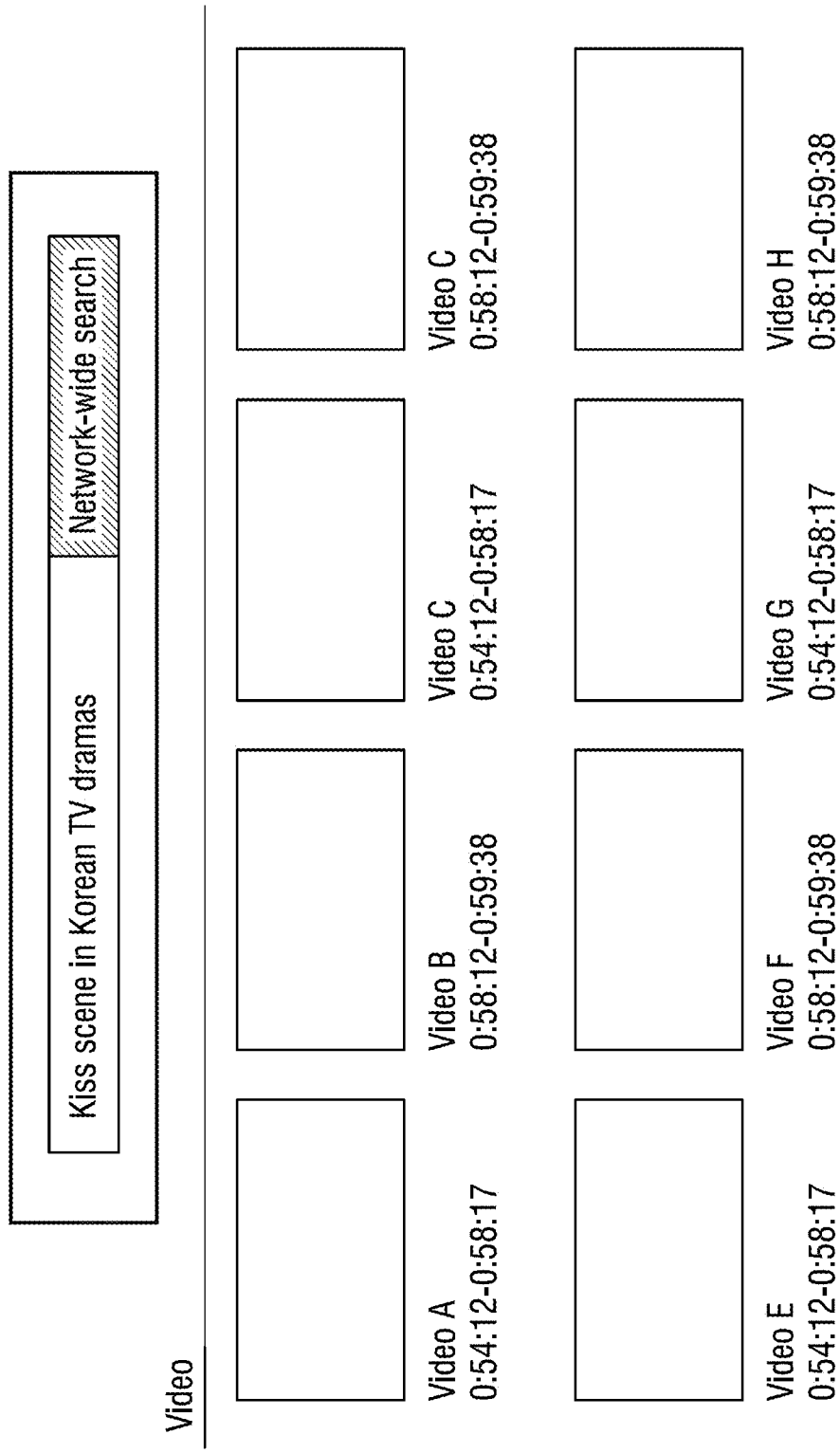

As shown in FIG. 2f, a search word of video content that needs to be searched for is directly entered in a comprehensive search box (marked by a black frame). For example, "kiss scene in Korean TV dramas" are entered. After recognizing the requirement, a system returns a result list of video segments that have been extracted from a set of videos on an entire network, and presents attribute information for a user to select, such as a title of a video segment (a TV drama name and a quantity of episodes, or a variety show name and a quantity of episodes, or the like), segment duration and time points, or players.

The following describes the technical architecture solutions separately.

Figure 2G:
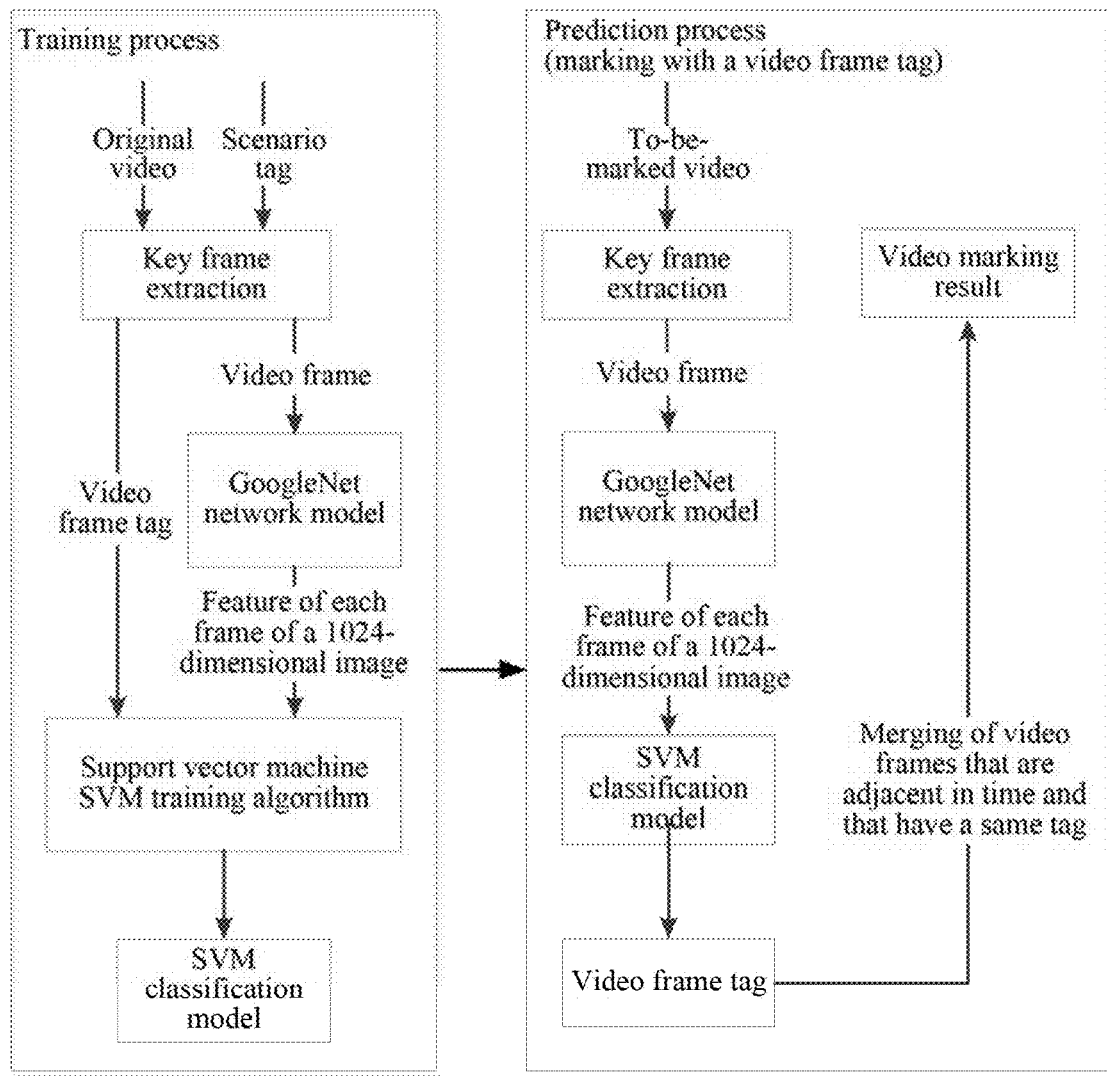

(1) How to Automatically Recognize a Video Frame Tag that Corresponds to a Video Segment For example, referring to FIG. 2g, FIG. 2g is a schematic diagram of a process in which training and learning are performed based on an existing original video that has been marked with a scenario tag, to generate a classification model, and a video frame tag of a video frame in a video is predicted by using the classification model and the video frame is marked. Specifically, during model training, first, a video segment (which may be referred to as the original video or an existing video) and a scenario tag that corresponding to the segment are obtained, as training data, from an existing video library that has been manually marked with a scenario tag. Key frame images (that is, second video frames) in the original video are extracted by using a key frame extraction algorithm, and these images are marked with video frame tags according to the scenario tag of the original video.

A 1024-dimensional floating point number is extracted from each frame of an image by using a trained GoogleNet network, and is used as an image feature (that is, a second image feature). Then, an SVM classification model is trained by using an SVM training algorithm according to the video frame tag. In this way, the training process is completed. The SVM classification model is a supervised learning model, and is usually used for performing pattern recognition, classification, and regression analysis.

During prediction, that is, during automatically marking with a video frame tag, first, a video frame (that is, a first video frame) in a video segment (that is, a to-be-marked video) is extracted by using a key frame extraction algorithm the same as that used in the training process, and a 1024-dimensional image feature (that is, a first image feature) of each video frame is obtained by using GoogleNet. Then, a video frame tag of each video frame is predicted by using the SVM classification model, that is output in the training process. Finally, video frames that are adjacent in time and that have a same video frame tag are merged, to obtain a marking result of the video segment.

(2) How to Perform Semantic Recognition on a Search Word of a User

Figure 2H:
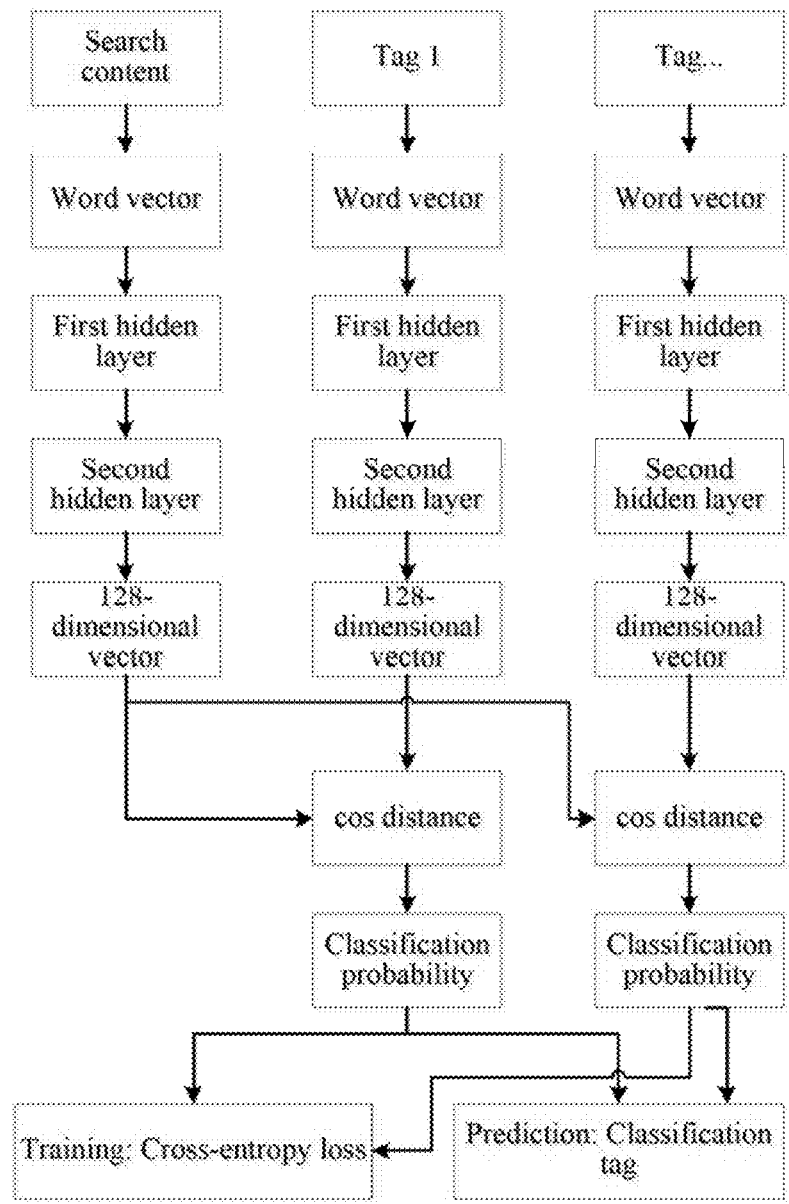

For example, referring to FIG. 2h, FIG. 2h is a schematic diagram of a process in which training and learning are performed based on search content that is collected during actual application and a corresponding intention tag, to generate a neural network model, and semantic recognition is performed on a search request by using the neural network model.

During training, first, search content that is involved during actual application and an intention tag that corresponds to the search content are collected. That is, a real Query (that is, the search content) and a search intention tag that corresponds to the Query are used as training data, to train a DNN (that is, the neural network model). A classification cross-entropy loss function is minimized, to make a cos distance between the Query and the tag that corresponds to the Query relatively small.

During prediction, first, semantic relevance between a search Query and a video frame tag is calculated by using the trained network model. That is, a Query of a user is converted into a 128-dimensional vector, and then cos distances between the vector and 128-dimensional vectors that correspond to all video frame tags are respectively calculated, and a tag that corresponds to the smallest cos distance is used as prediction output.

It can be learned from the foregoing descriptions that according to the video search method provided in this embodiment, first, a video frame tag of a video frame in a to-be-marked video is predicted by using a preset classification model, video frames that are adjacent in time and that have a same video frame tag are merged, and the to-be-marked video is marked with a corresponding video frame tag. Then, when a search request that instructs to search for a video is received from a user, a video frame tag that corresponds to the search request is determined based on a video frame tag marking result, and a target video that is marked with the video frame tag is found in a candidate video and is presented. In this embodiment, video frame tags are predicted, merged and marked to determine, according to a video frame tag marking result, a video frame tag that corresponds to a search request. That is, video content is searched for by using a video frame tag with which a video frame is marked in advance. Compared with a manner of manually adding a title, video search efficiency and accuracy of a search result are greatly improved.

Embodiment 3

To facilitate implementation of the video search method provided in the embodiments of the present disclosure, this embodiment of the present disclosure further provides an apparatus that is based on the foregoing video search method. Nouns have meanings the same as those in the foregoing video search method, and for implementation details, refer to the descriptions in the method embodiments.

Figure 3A:
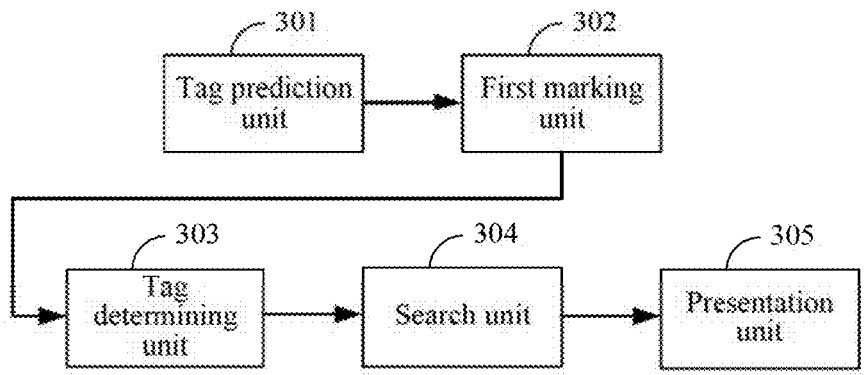
FIG. 3a is a schematic structural diagram of a video search apparatus according to Embodiment 3 of the present disclosure.

Referring to FIG. 3a, FIG. 3a is a schematic structural diagram of a video search apparatus according to an embodiment of the present disclosure. The apparatus may include a tag prediction unit 301, a first marking unit 302, a rag determining unit 303, a search unit 304, and a presentation unit 305.

The tag prediction unit 301 is configured to: obtain a to-be-marked video, and predict a video frame tag, of a video frame in the to-be-marked video by using a preset classification model. The first marking unit 302 is configured to: merge video frames that are adjacent in time and that have a same video frame tag, and mark the to-be-marked video with a corresponding video frame tag.

It may be understood that, in one aspect, videos on an entire network need to be marked with video frame tags before the search request is processed. That is, a video frame tag of a video frame in a to-be-marked video is predicted by using a preset classification model, video frames that are adjacent in time and that have a same video frame tag are merged, and the to-be-marked video is marked with a corresponding video frame tag, so as to obtain a video tag marking result.

That is, a video search provided in this embodiment is essentially a content-based video search. First, video frame tags of video frames in a to-be-marked video are predicted by using a preset classification model. After prediction, these video frames are collated, and video frames that are adjacent in time and that have a same video frame tag are merged, so as to obtain video segments. Finally, these video segments are respectively marked with corresponding video frame tags, to obtain a video segment marking result, and complete marking of the to-be-marked video by using the video frame tags.

The tag determining unit 303 is configured to determine, based on a video frame tag marking result when a search request that instructs to search for a video is received, a video frame tag that corresponds to the search request. The search unit 304 is configured to search a candidate video for a target video that is marked with the video frame tag. The presentation unit 305 is configured to present the target video.

Further, the tag prediction may include:

(11) an extraction subunit, configured to: extract a video frame in the to-be-marked video by using a key frame extraction algorithm, and determine extracted video frame as a first video frame;

(12) an obtaining subunit, configured to: obtain an image feature of each first video frame, and determine the obtained image feature as a first image feature; and

(13) a prediction subunit, configured to predict a video frame tag of the first video frame according to the first image feature by using the preset classification model.

It may be understood that, for ease of distinguishing and understanding, in this embodiment, the video frame in the to-be-marked video is referred to as the first video frame, and the image feature of the first video frame is referred to as the first image feature. This is not intended to limit implementation of the solution.

Based on this, the first marking unit 302 may be specifically configured to: merge first video frames that are adjacent in time and that have a same video frame tag, and mark the to-be-marked video with a corresponding video frame tag.

In the key frame extraction algorithm, a video sequence is partitioned into shots, and then a key frame that can represent shot content is extracted from a shot, and the shot is indexed and searched for by using a low-level feature (such as a color, a texture, or a shape) that is extracted from the key frame. The key frame may be extracted based on a shot boundary, extracted based on content analysis, extracted based on clustering, or the like. This is not specifically limited herein.

For another example, after a video frame (that is, the first video frame) in the to-be-marked video is extracted, an image feature (that is, the first image feature) of each first video frame may be obtained by using a deep learning model (GoogleNet), and then a video frame tag of each first video frame is predicted by using a preset classification model such as an SVM classification model.

Figure 3B:
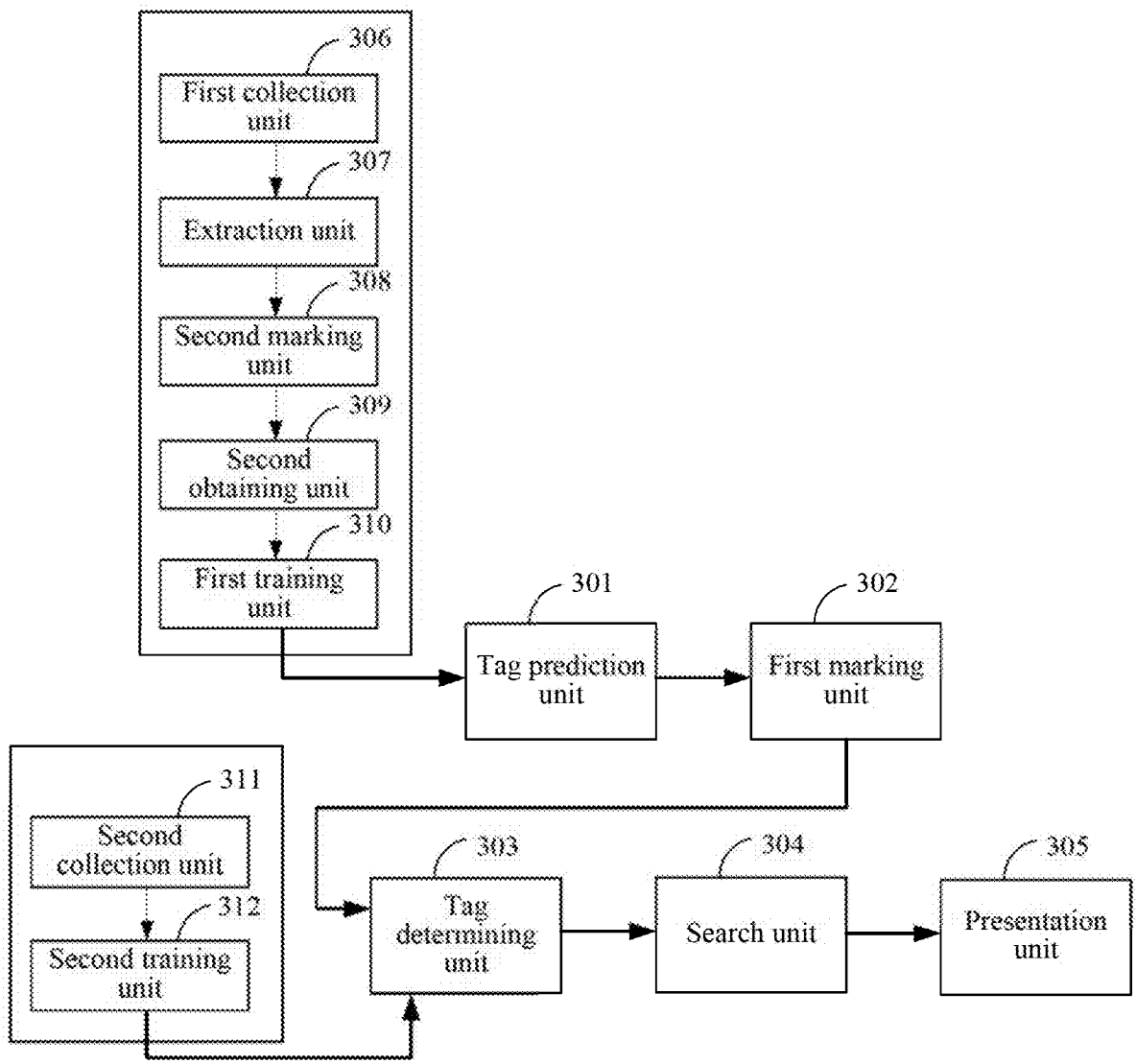
FIG. 3b is another schematic structural diagram of a video search apparatus according to Embodiment 3 of the present disclosure.

Further, also referring to FIG. 3*b*, FIG. 3*b* is another schematic structural diagram of the video search apparatus. A classification model may be further determined before videos on an entire network are marked with video frame tags. For example, the apparatus may further include:

a. a first collection unit 306, configured to collect an original video that has been marked with a scenario tag;

b. an extraction unit 307, configured to: extract a video frame in the original video by using a key frame extraction algorithm, and determine the extracted video frame as a second video frame;

c. a second marking unit 308, configured to mark the second video frame with a video frame tag according to the scenario tag;

d. a second obtaining unit 309, configured to: obtain an image feature of each second video frame, and determine the obtained image feature as a second image feature; and e. a first training unit 310, configured to perform training based on the video frame tag with which the second video frame is marked and the second image feature, to generate a classification model.

It is readily conceived that, for ease of distinguishing and understanding, in this embodiment, the video frame in the original video that has been marked with a scenario tag is referred to as the second video frame, and the image feature of the second video frame is referred to as the second image feature. This is not intended to limit implementation of the solution.

Based on this, the prediction subunit may be specifically configured to predict a video frame tag of the first video frame according to the first image feature by using the classification model.

Specifically, for example, a video segment (which may be referred to as the original video) that has been manually marked with a scenario tag and the scenario tag that corresponds to the video segment are used as training data. A video frame in the original video is extracted by using a key frame extraction algorithm the same as that described above, and an image feature of the video frame in the original video is obtained in the same manner. The SVM classification model is trained by using the SVM training algorithm, thereby completing the training process.

It may be understood that, the tag determining unit 303 determines the video frame tag that corresponds to the search request in multiple manners. For example, the tag determining unit 303 may specifically include:

(21) a receiving subunit, configured to receive a search request that instructs to search for a video;

(22) a recognition subunit, configured to perform semantic recognition on the search request based on a preset neural network model; and

(23) a tag determining subunit, configured to determine a video frame tag that corresponds to the search request with reference to a semantic recognition result and the video frame tag marking result.

That is, in another aspect, a network model for performing semantic recognition needs to be determined before the search request is processed. For example, the apparatus may further include:

a second collection unit 311, configured to collect search content and an intention tag that corresponds to the search content; and a second training unit 312, configured to perform training based on the search content and the intention tag, to generate a neural network model.

The search content and the corresponding intention tag may be obtained from an actual search request of a user. For example, the search content and the corresponding intention tag are used as training data to train a DNN, so as to generate a neural network model.

Based on this, the recognition subunit may be specifically configured to perform semantic recognition on the search request based on the neural network model.

To present the target video, in a possible implementation, when the candidate video is a currently played video, the receiving subunit is specifically configured to receive a search request that instructs to search for a video in a search box that corresponds to the currently played video.

Based on this, the presentation unit 305 may be specifically configured to: determine a play location of the target video on a play progress bar of the currently played video, and mark and prompt the play location, for a user to select a segment to play.

That is, in this implementation, a search box is set on a play page of a current video. A target video in the video may be obtained by doing a video search in the search box, and the target video herein is a segment of the current video.

In another possible implementation, when the candidate video is a set of videos on an entire network, the receiving subunit is specifically configured to receive a search request that instructs to search for a video in a network-wide search box.

Based on this, the presentation unit 305 may be specifically configured to present the target video and attribute information of the target video in a form of a list.

That is, in this implementation, a target video is searched for in videos on an entire network, and the target video is presented in a form of a list after the target video is found. Because many search results are obtained by means of a network-wide search, attribute information that corresponds to the target video is also presented. The attribute information may include one piece or a combination of the following information: a TV drama name and a quantity of episodes, a variety show name and a quantity of episodes, segment duration, players, or the like.

During specific implementation, the foregoing units may be implemented as independent entities, or may be implemented as one or more entities through random combination. For a specific implementation of each unit, refer to the foregoing method embodiments. Details are not described herein again.

The video search apparatus may be specifically integrated into a network device such as a server or a gateway.

It can be learned from the foregoing descriptions that according to the video search apparatus provided in this embodiment, first, a video frame tag of a video frame in a to-be-marked video is predicted by using a preset classification model, video frames that are adjacent in time and that have a same video frame tag are merged, and the to-be-marked video is marked with a corresponding video frame tag. Then, when a search request that instructs to search for a video is received from a user, a video frame tag that corresponds to the search request is determined based on a video frame tag marking result, and a target video that is marked with the video frame tag is found in a candidate video and is presented. In this embodiment, video frame tags are predicted, merged and marked to determine, according to a video frame tag marking result, a video frame tag that corresponds to a search request. That is, video content is searched for by using a video frame tag with which a video frame is marked in advance. Compared with a manner of manually adding a title, video search efficiency and accuracy of a search result are greatly improved.

Embodiment 4

This embodiment of the present disclosure further provides a terminal for implementing the foregoing video search method.

Figure 4:
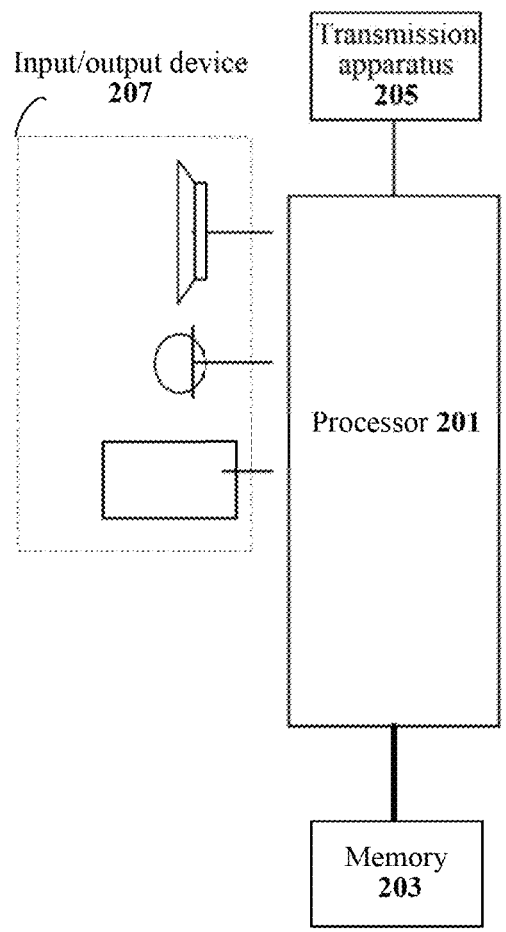
FIG. 4 is a structural block diagram of a terminal according to an embodiment of the present disclosure.

FIG. 4 is a structural block diagram of the terminal according to this embodiment of the present disclosure. As shown in FIG. 4, the terminal may include one or more processors 201 (only one processor is shown in the figure), a memory 203, and a transmission apparatus 205. As shown in FIG. 4, the terminal may further include an input/output device 207.

The memory 203 may be configured to store a software program and module, for example, program instructions/modules corresponding to the video search method and apparatus in the embodiments of the present disclosure. The processor 201 runs the software program and module stored in the memory 203 to implement various function application and data processing, that is, to implement the foregoing video search method. The memory 203 may include a high-speed random access memory, and may further include a non-volatile memory, for example, one or more magnetic storage apparatuses, flash memories, or other non-volatile solid-state memories. In some embodiments, the memory 203 may further include a memory remotely disposed relative to the processor 201, and the remote memory may be connected to the terminal through a network. Examples of the network include, but are not limited to, the Internet, an intranet, a local area network, a mobile communications network, or a combination thereof.

The transmission apparatus 205 is configured to receive or send data by using a network. A specific example of the network may include a wired network or a wireless network. In an example, the transmission apparatus 205 includes a network interface controller (Network Interface Controller, NIC). The NIC may be connected to another network device or a router by using a network cable, to communicate with the Internet or a local area network. In an example, the transmission apparatus 205 is a radio frequency (RF) module, and is configured to communicate with the Internet in a wireless manner.

Specifically, the memory 203 is configured to store an application program.

The processor 201 may invoke the application program stored in the memory 203 to perform the following steps: obtaining a to-be-marked video, and predicting a video frame tag of a video frame in the to-be-marked video by using a preset classification model; merging video frames that are adjacent in time and that have a same video frame tag, and marking the to-be-marked video with a corresponding video frame tag; determining, based on a video frame tag marking result when a search request that instructs to search for a video is received, a video frame tag that corresponds to the search request; and searching a candidate video for a target video that is marked with the video frame tag, and presenting the target video.

The processor 201 is further configured to perform the following steps: extracting a video frame in the to-be-marked video by using a key frame extraction algorithm, and determining the extracted video frame as a first video frame; obtaining an image feature of each first video frame, and determining the obtained image feature as a first image feature; predicting a video frame tag of the first video frame according to the first image feature by using the preset classification model; and merging first video frames that are adjacent in time and that have a same video frame tag.

The processor 201 is further configured to perform the following steps: collecting, before obtaining a to-be-marked video, an original video that has been marked with a scenario tag; extracting a video frame in the original video by using a key frame extraction algorithm, and determining the extracted video frame as a second video frame; marking the second video frame with a video frame tag according to the scenario tag; obtaining an image feature of each second video frame, and determining the obtained image feature as a second image feature; performing training based on the video frame tag with which the second video frame is marked and the second image feature, to generate a classification model; and predicting a video frame tag of the first video frame according to the first image feature by using the classification model.

The processor 201 is further configured to perform the following steps: when a search request that instructs to search for a video is received, performing semantic recognition on the search request based on a preset neural network model; and determining a video frame tag that corresponds to the search request with reference to a semantic recognition result and the video frame tag marking result.

The processor 201 is further configured to perform the following steps: before the search request that instructs to search for a video is received, collecting search content and an intention tag that corresponds to the search content; and performing training based on the search content and the intention tag, to generate a neural network model; and performing semantic recognition on the search request based on the neural network model.

The processor 201 is further configured to perform the following steps: receiving a search request that instructs to search for a video in a search box that corresponds to the currently played video; and determining a play location of the target video on a play progress bar of the currently played video, and marking and prompting the play location, for a user to select a segment to play.

The processor 201 is further configured to perform the following steps: receiving a search request that instructs to search for a video in a network-wide search box, and presenting the target video and attribute information of the target video in a form of a list.

A person of ordinary skill in the art may understand that the structure shown in FIG. 4 is only an example. The terminal may be a terminal device, such as a smartphone (for example, an Android phone or an iOS phone), a tablet computer, a palmtop computer, a mobile Internet device (MID), or a PAD. FIG. 4 is not intended to limit the structure of the foregoing electronic apparatus (e.g., the terminal). For example, the terminal may include more or fewer components (such as a network interface or a display apparatus) than those shown in FIG. 4, or may have a configuration different from that shown in FIG. 4.

A person of ordinary skill in the art may understand that all or some of the steps of the methods in the embodiments may be implemented by a program instructing relevant hardware of the terminal device. The program may be stored in a computer readable storage medium, and the storage medium may include a flash memory, a read-only memory (ROM), a random access memory (RAM), a magnetic disk, an optical disc, or the like.

Embodiment 5

This embodiment of the present disclosure further provides a storage medium. Optionally, in this embodiment, the storage medium may be configured to store program code for executing a video search method.

Optionally, in this embodiment, the storage medium may be located in at least one of multiple network devices on a network shown in the foregoing embodiments.

Optionally, in this embodiment, the storage medium is configured to store program code for executing the following steps:

First step: Obtain a to-be-marked video, and predict a video frame tag of a video frame in the to-be-marked video by using a preset classification model.

Second step: Merge video frames that are adjacent in time and that have a same video frame tag, and mark the to-be-marked video with a corresponding video frame tag.

Third step: Determine, based on a video frame tag marking result when a search request that instructs to search for a video is received, a video frame tag that corresponds to the search request.

Fourth step: Search a candidate video for a target video that is marked with the video frame tag, and present the target video.

Optionally, the storage medium is further configured to store program code for executing the following steps: extracting a video frame in the to-be-marked video by using a key frame extraction algorithm, and determining the extracted video frame as a first video frame; obtaining an image feature of each first video frame, and determining the obtained image feature as a first image feature; predicting a video frame tag of the first video frame according to the first image feature by using the preset classification model; and merging first video frames that are adjacent in time and that have a same video frame tag.

Optionally, the storage medium is further configured to store program code for executing the following steps: before the to-be-marked video is obtained, collecting an original video that has been marked with a scenario tag; extracting a video frame in the original video by using a key frame extraction algorithm, and determining the extracted video frame as a second video frame; marking the second video frame with a video frame tag according to the scenario tag; obtaining an image feature of each second video frame, and determining the obtained image feature as a second image feature; performing training based on the video frame tag with which the second video frame is marked and the second image feature, to generate a classification model; and predicting a video frame tag of the first video frame according to the first image feature by using the classification model.

Optionally, the storage medium is further configured to store program code for executing the following steps: when a search request that, instructs to search for a video is received, performing semantic recognition on the search request based on a preset neural network model; and determining a video frame tag that corresponds to the search request with reference to a semantic recognition result and the video frame tag marking result.

Optionally, the storage medium is further configured to store program code for executing the following steps: before the search request that instructs to search for a video is received, collecting search content and an intention tag that corresponds to the search content; and performing training based on the search content and the intention tag, to generate a neural network model; and performing semantic recognition on the search request based on the neural network model.

Optionally, the storage medium is further configured to store program code for executing the following steps: receiving a search request that instructs to search for a video in a search box that corresponds to the currently played video; and determining a play location of the target video on a play progress bar of the currently played video, and marking and prompting the play location, for a user to select a segment to play.

Optionally, the storage medium is further configured to store program code for executing the following steps: receiving, a search request that instructs to search for a video in a network-wide search box, and presenting the target video and attribute information of the large video in a form of a list.

Optionally, in this embodiment, the storage medium may include but is not limited to: any medium that can store program code, such as a USB flash drive, a ROM, a RAM, a removable hard disk, a magnetic disk, or an optical disc.

In the foregoing embodiments, the descriptions of the embodiments have respective focuses. For the part that is not described in detail in an embodiment, refer to the foregoing detailed descriptions of the video search method, and details are not described herein again.

The video search apparatus provided in the embodiments of the present disclosure may be, for example, a computer, a tablet computer, or a mobile phone that has a touch function. The video search apparatus is based on the same concept as that of the video search method in the foregoing embodiments. Any method provided in the embodiments of the video search method may be performed by the video search, apparatus. For detailed implementation, refer to the embodiments of the video search method, and details are not described herein again.

It is noted that, a person of ordinary skill in the art may understand that, all or some of the processes of the video search method according to the embodiments of the present disclosure may be implemented by a computer program controlling relevant hardware. The computer program may be stored in a computer readable storage medium, for example, stored in a memory of a terminal, and executed by at least one processor in the terminal. The execution process may include the processes of the embodiments of the video search method. The storage medium may include a magnetic disk, an optical disc, a ROM, a RAM, or the like.

For the video search apparatus in the embodiments of the present disclosure, the functional modules thereof may be integrated into one processing chip, or each of the modules may exist alone physically, or two or more modules may be integrated into one module. The foregoing integrated module may be implemented in a form of hardware or in a form of a software functional module. When the integrated module is implemented in a form of a software functional module and sold or used as an independent product, the integrated module may be stored in a computer-readable storage medium. The storage medium may be, for example, a ROM, a magnetic disk, or an optical disc.

The video search method and apparatus provided in the embodiments of the present disclosure are described above in detail. Although the principle and the implementations of the present disclosure are described by using specific examples in this specification, the foregoing descriptions of the embodiments are only intended to help understand the method and the core idea of the method of the present disclosure. Meanwhile, a person skilled in the art may make modifications to the specific implementations and application range according to the idea of the present disclosure. In conclusion, the content of this specification should not be construed as a limit to the present disclosure.

What is claimed is:

1. A method for video search, comprising:
obtaining a video to be labeled;
selecting feature tags respectively for video frames in the video using a classification model;
combining at least a first video frame and an adjacent second video frame of the video frames into a video segment when the respective feature tag selected using the classification model for the first video frame and the respective feature tag selected using the classification model for the second video frame are matching; and
labeling, by circuitry of an information processing apparatus, the video segment with a segment feature tag corresponding to the matching feature tags.

2. The method according to claim 1, further comprising:
determining a search tag in response to a search request;
searching one or more candidate videos that have been labeled with feature tags according to the search tag; and
presenting an output video when the output video includes a matching feature tag to the search tag.

3. The method according to claim 1, wherein the selecting the feature tags respectively for the video frames in the video using the classification model comprises:
extracting a first key video frame in the video to be labeled;
obtaining first image features of the first key video frame; and
selecting a feature tag for the first key video frame according to the first image features using the classification model.

4. The method according to claim 1, further comprising:
collecting one or more source videos that have been pre-labeled with scenario tags;
extracting second key video frames in the one or more source videos;
determining second feature tags respectively for the second key video frames according to the scenario tags;
obtaining second image features respectively for the second key video frames; and
training the classification model based on the second image features and the second feature tags.

5. The method according to claim 2, wherein the determining the search tag in response to the search request comprises:
performing a semantic recognition on the search request based on a neural network model; and
determining the search tag in response to the search request according to a semantic recognition result and available feature tags for classification.

6. The method according to claim 5, further comprising:
collecting search content with corresponding search tags; and
training the neural network model based on the search content and the corresponding search tags.

7. The method according to claim 2, wherein the determining the search tag in response to the search request further comprises:
receiving the search request in a search box for a video during a playback to search the video during the playback.

8. The method according to claim 7, wherein the presenting the output video when the output video includes the matching feature tag to the search tag further comprises:
determining, on a progress bar, a specific position corresponding to a specific video segment with the matching feature tag; and
prompting the specific position for a selection of the specific video segment to play.

9. The method according to claim 2, wherein the determining the search tag in response to the search request further comprises:
receiving the search request in a search box for a plurality of videos to search the plurality of videos.

10. The method according to claim 9, wherein the presenting the output video when the output video includes the matching feature tag to the search tag further comprises:
presenting a list of output videos respectively in a form of video information and attribute information.

11. An information processing apparatus, comprising:
interface circuitry configured to receive a video to be labeled; and
processing circuitry configured to:
select feature tags respectively for video frames in the video using a classification model;
combine at least a first video frame and an adjacent second video frame of the video frames into a video segment when the respective feature tag selected using the classification model for the first video frame and the respective feature tag selected using the classification model for the second video frame are matching; and
label the video segment with a segment feature tag corresponding to the matching feature tags.

12. The information processing apparatus according to claim 11, wherein the processing circuitry is configured to:
determine a search tag in response to a search request;
search one or more candidate videos that have been labeled with feature tags according to the search tag; and
present an output video when the output video includes a matching feature tag to the search tag.

13. The information processing apparatus according to claim 11, wherein
the processing circuitry is configured to:
extract a first key video frame in the video to be labeled;
obtain first image features of the first key video frame; and
select a feature tag for the first key video frame according to the first image features using the classification model.

14. The information processing apparatus according to claim 11, wherein the processing circuitry is configured to:
receive one or more source videos that have been pre-labeled with scenario tags;
extract second key video frames in the one or more source videos;
determine second feature tags respectively for the second key video frames according to the scenario tags;
obtain second image features respectively for the second key video frames; and
train the classification model based on the second image features and the second feature tags.

15. The information processing apparatus according to claim 12, wherein the processing circuitry is configured to:
perform a semantic recognition on the search request based on a neural network model, and
determine the search tag in response to the search request according to a semantic recognition result and available feature tags for classification.

16. The information processing apparatus according to claim 15, wherein the processing circuitry is configured to:
receive collected search content with corresponding search tags, and
train the neural network model based on the search content and the corresponding search tags.

17. The information processing apparatus according to claim 12, wherein the interface circuitry is configured to
receive the search request that is entered in a search box associated with a video in play to request a search of the video in play.

18. The information processing apparatus according to claim 17, wherein the processing circuitry is configured to
determine, on a progress bar, a specific position corresponding to a specific video segment with the matching feature tag; and
prompt, via the interface circuitry, the specific position for a selection of the specific video segment to play.

19. The information processing apparatus according to claim 12, wherein the interface circuitry is configured to
receive the search request that is entered in a search box associated with a plurality of videos to search the plurality of videos.

20. The information processing apparatus according to claim 19, wherein the processing circuitry is configured to
present, via the interface circuitry, a list of output videos respectively in a form of video information and attribute information.

21. A method for video search, comprising:
determining a search tag in response to a search request;
searching one or more candidate videos that have been labeled with feature tags according to the search tag; and
presenting an output video when the output video includes a matching feature tag to the search tag, wherein
the presenting the output video includes indicating, on a progress bar of the output video, one or more ranges respectively corresponding to one or more video segments having the matching feature tag, and
receiving a selection of one of the ranges for playing a corresponding one of the video segments.

22. The method according to claim 21, wherein the determining the search tag in response to the search request further comprises:
in response to a determination that an indicator has been moved into a search icon area during playback of a video, displaying a search box;
receiving the search tag as input into the search box; and
searching the video as a candidate video according to the search tag.

23. The method according to claim 21, wherein
the indicating the one or more ranges on the progress bar includes displaying one or more video frames respectively associated with each of the one or more ranges, and
the receiving the selection of the one of the ranges includes receiving a selection of a video frame associated with the one of the ranges.

* * * * *